(12) United States Patent
Hansen

(10) Patent No.: US 6,254,900 B1
(45) Date of Patent: Jul. 3, 2001

(54) METHOD FOR THE MANUFACTURE OF CHEESE, QUARK AND YOGURT PRODUCTS FROM SOYBEANS

(76) Inventor: Wilhem Hansen, In de Simp 2a, D-25421 Pinneberg (DE)

( * ) Notice: Subject to any disclaimer, the term of this patent is extended or adjusted under 35 U.S.C. 154(b) by 0 days.

(21) Appl. No.: 09/195,006

(22) Filed: Nov. 18, 1998

Related U.S. Application Data

(63) Continuation-in-part of application No. PCT/EP97/02535, filed on May 17, 1997.

(51) Int. Cl.$^7$ .................................................. A23L 1/20
(52) U.S. Cl. ............................. 426/46; 426/34; 426/44; 426/634
(58) Field of Search .................. 426/46, 34, 36, 426/44, 38, 580, 582, 583, 585, 634

(56) References Cited

U.S. PATENT DOCUMENTS 3,857,970 * 12/1974 Tsumura et al. .................... 426/46

FOREIGN PATENT DOCUMENTS

| | | |
|---|---|---|
| 2406600 | 8/1974 | (DE) . |
| 3730384 | 2/1988 | (DE) . |
| 0500132 | 8/1992 | (EP) . |
| 2629310 | 10/1989 | (FR) . |
| 874537 | 8/1961 | (GB) . |
| 1356363 | 6/1974 | (GB) . |
| 1383148 | 2/1975 | (GB) . |
| 1383149 | 2/1975 | (GB) . |
| 1518952 | 7/1978 | (GB) . |
| 60-12929 | * 1/1985 | (JP) ....................................... 426/46 |

OTHER PUBLICATIONS

Minegishi, N., Patent Abstracts of Japan, abstracting JP 63–7743, Jan. 1988.*
Indian Journal Of Microbiology, vol. 15, No, 1, 1975, pp. 18–26, XP002040240 S. Kothari: "Studies on fermented milk products III. Activity of cheese and yoghurt cultures in soymilk and fortified soymilk." see p. 18, col. 2, paragraph 3 –p. 19.

* cited by examiner

*Primary Examiner*—Leslie Wong
(74) *Attorney, Agent, or Firm*—Nils H. Ljungman & Associates

(57) ABSTRACT

A process for producing cheese, curd or yogurt products from soya beans involving the steps: (a) preparation of soya milk from soya beans; (b) addition of vegetable sugar to the soya milk in the proportion of about 1 to 5 wt %; (c) emulsifying vegetable fats and/or oils in a total proportion of some 15 wt % in the soya milk; (d) preparation of a culture cocktail with a pH between about 3.8 and 4.5 by the addition of commercially available cheese cultures and animal lactose in a proportion of some 10 wt % of the vegetable sugar added in step (b) to the soya milk as in step (a); (e) addition of the culture cocktail to the soya milk as per step (c) to curdle it and ferment it as desired, and (f) subsequent ripening and final processing in a known manner to provide the desired cheese, curd or yogurt product.

18 Claims, No Drawings

METHOD FOR THE MANUFACTURE OF CHEESE, QUARK AND YOGURT PRODUCTS FROM SOYBEANS

This application is a Continuation-in-Part application of International Application No. PCT/EP97/02535, filed on May 17, 1997 and claiming priority from Federal Republic of Germany Patent Application No. DE 196 20 101.2, filed on May 18, 1996. International Application No. PCT/EP97/02535 was pending as of the filing date of the above-cited application. The United States was an elected state in International Application No. PCT/EP97/02535.

BACKGROUND OF THE INVENTION

1. Field of the Invention

The present invention relates to a method for the manufacture of cheese, quark, cottage cheese or curd and yogurt products from soybeans or from the beans of other legumes.

2. Background Information

Soy products are well-known and are widely used in many different forms. The 100% vegetable protein obtained from the soybean can be easily digested and is a valuable substitute for animal protein in various applications. Soy products also contain substantially no cholesterol and substantially no animal fats, excessive amounts of which substances can have a harmful effect on health. Soy products can also be particularly important for people who are allergic to the protein in animal milk or who cannot digest cholesterol or lactose, or who are diabetic. Soybean protein can also be significantly easier to digest than animal milk protein by people suffering from stomach and intestinal illnesses.

Finally, there has been a constant increase in the number of people who, for a variety of reasons, are required to or choose to eat vegetarian food exclusively.

Soybean protein can theoretically replace animal protein in substantially any food. The disadvantage of foods manufactured using soybean protein is primarily that they substantially always have the taste typical of soybeans, which can be subjectively more or less unpleasant, in particular if foods from such a source must be eaten frequently.

German Laid Open Patent Application No. 37 30 384 describes a known method for the use of soy milk to manufacture a product that is similar to a Camembert cheese. Using this known method, however, it is not possible to completely eliminate the typical aftertaste of soybeans.

OBJECT OF THE INVENTION

The object of the present invention is therefore to create a method for the manufacture of cheese, yogurt and quark, cottage cheese or curd products from soybeans or other legumes, by means of which process the typical slight taste of soybeans can be substantially eliminated.

SUMMARY OF THE INVENTION

The present invention teaches that this object can be accomplished by a method of the type described above which is characterized by the following process steps:

(a) Preparation of soy milk from soybeans;
(b) Addition of vegetable sugar to the soy milk in a proportion from approximately 1 to approximately 5% by weight;
(c) Emulsification of vegetable fats and/or vegetable oils with a total content of approximately 15% by weight into the soy milk;
(d) Preparation of a culture cocktail suspension with a pH of between approximately 3.8 and approximately 4.5 by the addition of commercial cheese cultures and animal lactose in a proportion of approximately 10% by weight of the vegetable sugar added in Step (b) to soy milk as described in Step (a);
(e) Addition of the culture cocktail to the soy milk as described in Step (c), to acidify the soy milk and to ferment it if necessary, and
(f) A final ripening and processing in a known manner into the desired cheese, quark or yogurt product.

The method can also be used for the manufacture of cheese, quark and yogurt products from the beans of other legumes, although it is undoubtedly of the greatest importance for soybeans.

Using this method, it becomes possible for the first time to manufacture various types of cheeses, such as cream cheese, soft cheeses and hard cheeses on a substantially purely vegetable basis, which in terms of their taste, their scent, their appearance and their consistency differ little or not at all from the corresponding types of cheese manufactured substantially from cow's milk, and in some instances can even be superior to cheeses made from cow's milk.

An additional advantage of the method is that it can be suitable not only for the manufacture of different types of cheeses, but also for the manufacture of yogurt and quark, curd or cottage cheese products, if the subsequent ripening and final processing are performed in the customary manner for these products.

It is also particularly advantageous if the final product manufactured is not only substantially free of animal ingredients and therefore contains substantially no animal protein, substantially no animal fat, substantially no cholesterol and substantially no lactose (milk sugar), but also contains substantially no sodium chloride and substantially no refined sugar.

As a result of the addition of very small amounts of animal lactose (in particular sugar from cow's milk), which is fermented substantially in its entirety into lactic acid, the lactic acid bacteria in the lactose weaning phase are stimulated to ferment the plant sugars that are available in copious amounts. The way is thereby opened for the decomposition of the plant protein by the generic mold and yeast mold fungi symbiosis described below. As the process continues, the enzymes of the above named species, by lipolysis, produce the cheese taste typical of the corresponding type of cheese.

As a result of the addition of vegetable fats and vegetable oils, the fat content of the final product can be adjusted to meet the desired and requirements of the final consumer. The same is true for the selection of the quality, type or grade of fat.

Quark and cream cheese products can be manufactured in particular in that the soy milk is acidified with the culture cocktail to a pH of approximately 4.5 and then up to 30% by weight of water is separated and removed, and then, approximately 0.5% sea salt and herb and/or fruit preparations are added to enhance the taste. The method including the soybean protein from the soy milk is coagulated by the addition of a coagulant, and the water that is discharged is removed is particularly well suited for the manufacture of soft cheese. The method including the coagulant is magnesium chloride from sea salt, which is added at a temperature of the soy milk of approximately 85° C. in a proportion of approximately 2.5% by weight is preferably used for the manufacture of hard cheese.

Three particular preferred and advantageous methods are described below by way of example.

In all three examples, soy milk is first obtained from the soybeans in the usual manner. For this purpose, the soybeans are preferably soaked in cold water, with or without their shells, hulls or husks, for approximately 12 to 14 hours, whereby the quantity of water is approximately five times greater than the quantity of soybeans, and the water is removed after the soaking.

The beans are then ground into a puree with an amount of hot water that is approximately six times greater in a colloid mill. The fibrous material or okara, is then separated through a sieve or using a decanter or a centrifuge.

The soy milk discharged has a solid matter content from approximately 5 to 15% (normally about 12%) and is then subjected to a known heating process, such as a pasteurization or an ultra-pasteurization.

Before or after the heating, a significant portion of the undesirable scent and taste substances (purines) are extracted from the soy milk by vacuum degassing.

The soy milk prepared in this manner is the primary material for the further processing as claimed by the invention into cheese, quark or yogurt products, as indicated in the following examples.

EXAMPLE 1

1.1) To manufacture a cream cheese or another product similar to quark, the soy milk is first adjusted to a solid matter content of approximately 12% by weight.

1.2) Dextrose or glucose is then added to the soy milk in a proportion of about 1 to 5% by weight, preferably about 2% by weight. Approximately 0.1% by weight of vegetable food coloring can also be added.

1.3) The soy milk is then heated to about 70 to about 90° C., preferably about 85° C.

1.4) Then the vegetable fats and vegetable oils containing a substantially high percentage of unsaturated fatty acids are added and emulsified in the soy milk, whereby the vegetable fats and vegetable oils are preferably added in equal amounts, and their total concentration is approximately 15% by weight. Examples of vegetable fats and vegetable oils, which may be used in at least one embodiment of the present invention, are cold pressed thistle oil, wheat germ or wheat kernel oil, palm kernel oil or palm oil, and preferably, oils based on plants from biological cultivations.

1.5) This soy milk is then mixed with a culture cocktail in the form of a soy milk suspension of about 1 to 4% by weight, preferably about 2% by weight, which is prepared as follows:

1.6a) Soy milk is mixed at about 45 to 35° C., preferably about 38° C., with commercial cheese cultures for cream cheese such as Series M "Probat" and/or a thermophilic culture such as Series V yogurt, both of which are commercially available from the firm of Wiesby in Niebull, Federal Republic of Germany, and are described in the "Wiesby Product Manual" (1996). Sugar from cow's milk is also added, the amount of which is approximately 10% by weight of the dextrose or glucose added in Step 1.2). The quantity of bacteria cultures added can be about 2 to 3.5% by weight. This quantity can depend on, among other possible factors, the desired acidity of the end product, the acidification temperature, and the desired viscosity of the end product. This amount of bacteria culture can be comparable to known processes for the production of cheese, curd or yogurt. The culture can contain, for example, bacteria such as *Streptococcus* (Sc) *lactis, Streptococcus* (Sc) *thermophilus, Lactobacillus* (Lb) *bulgaricus, and/or Lactobacillus* (Lb) *delbruecii.*

1.6b) The soy milk inoculated in this manner, i.e. by addition of the culture as described above and by homogeneous mixing of the soy milk with the culture, is acidified (preferably by the culture) at approximately 38° C. to a pH from about 3.8 to about 4.5, preferably about 4.1, and forms the culture cocktail (soy milk suspension) described above.

1.7) As in Step 1.5), the soy milk is acidified at approximately 38° C. with the culture cocktail to a pH from about 4.1 to about 4.8, preferably about 4.5. The quantity of culture cocktail needed to acidify the soy milk can be about 1 to 4% by weight. This quantity can depend on, among other possible factors, the desired acidity of the end product, the acidification temperature, and the desired viscosity of the end product. This acidity can be comparable to known processes for the production of cheese, curd or yogurt. Following the acidification, up to about 30% by weight of the water is separated and removed. Then the processing continues in the conventional manner, e.g. by seasoning, ripening, heating and packaging, to obtain the desired finished product. The cream cheese described above can be manufactured by the following steps:

1.8) The soybean protein is combined with approximately 0.5% by weight of sea salt and with the flavor enhancing ingredients customary in cream cheese, such as chives, parsley, pepper, onions or prepared fruits, the proportion of which is approximately 0.1% by weight for the dry ingredients, and approximately 10% by weight for the ingredients containing water.

1.9) The product is then pumped through a mill used for making quark in the conventional manner, to improve its creamy consistency, and for preservation is conducted through a heat treatment line in which it is heated to approximately 62° C. for approximately 1 to 5 seconds. It is then mechanically packaged in appropriate containers and refrigerated at a temperature from about 4 to 6° C. until it reaches the final consumer.

With regard to its appearance, its consistency, its scent and its taste, this product does not differ significantly from a corresponding product made from animal milk.

EXAMPLE 2

2.1) To manufacture soft cheese or another product similar to Camembert, the primary material is the same soy milk as in example 1.

2.2) This soy milk is treated as described in Steps 1.1) to 1.4) in Example 1.

2.3) This soy milk is then mixed at approximately 85° C. with a coagulant, and preferably Nigari (magnesium chloride) from sea salt, in a proportion of from about 0.1 to about 5% by weight, preferably about 0.15% by weight, and distributed by gentle agitation so that approximately 20% by weight of water is discharged during the coagulation. This water is removed.

2.4) The coagulated soybean protein is then washed once or twice with hot water (approximately 90° C.). Stable protein globules result, which are of major importance for the proper consistency and attractive appearance of the final product.

2.5) For further dehydration to a moisture content of approximately 70% by weight and for the shaping of the final product, the soybean protein—preferably at approximately 90° C.—is treated in a pressing and molding system of the type conventionally used in the cheesemaking industry. The press pressure is applied to appropriate molds for Brie or Camembert, and is increased over one hour from about 0 to approximately 5 kg/cm2. The product is then turned in the mold, and the manufacturer determines whether it has developed sufficient strength. If necessary, the molding is continued at approximately 5 kg/cm2 for a maximum of approximately 30 minutes.

2.6) The cheese is then cooled to a temperature below about 45° C.

2.7) Using, for example, hollow needles, the cheese is injected on the sides, top and bottom at intervals of up to about 1 cm with a culture cocktail which is produced as described in the steps under 2.8), and is injected in quantities that are substantially as great as the cheese can absorb. The limit of absorption can be observed because the substance injected can become visible on its surface. The cheese is thereby acidified and fermented.

As an alternative to Steps 2.5) to 2.7), the soybean protein can first be cooled to approximately 45° C. (Step 2.6)). Then the culture cocktail can be injected (Step 2.7) and the injected cheese can then be molded and shaped, as described in Step 2.5).

The culture cocktail can be prepared as follows:

2.8a) Soy milk is first treated as described in Step 1.6a) in example 1.

2.8b) About 1 to 10% by weight, preferably about 5% by weight, of commercial Kombucha-Teepilz culture symbiosis (tea fungus) is then added to this soy milk.

2.8c) The soy milk inoculated in this manner is then acidified to a pH of about 3.8 to about 4.5, preferably about 4.1, by the cultures added as described in Step 2.8a) at approximately 38° C.

2.8d) About 1 to 2 doses or units of mold fungus culture are then added to each liter of this suspension, namely *Penicillium candidum* and/or *Penicillium camemberti* and/or *Geotrichum candidum*. The cultures in question are commercial cheesemaking cultures that are available from the company named in Step 1.6a). To enhance the taste typical of a specific variety of cheese, cheese flavor can also naturally be added to the culture cocktail.

2.9) The injected and molded cheese is then placed in a saturated sea salt brine at a temperature of approximately 15 to 18° C. to equalize the salt content. The salt brine contains an aqueous solution of bedstraw and the cultures of cheese bacteria necessary for the desired variety of cheese.

2.10) The ripening of the product begins at approximately 16 to 18° C. and at a relative humidity of approximately 70 to 80% for a hold time of approximately 24 hours. Then the ripening continues for about 6 to 8 days at approximately 15 to 16° C. and at a relative humidity of about 90 to 95%. A more rapid ripening can be performed at about 17 to 18° C. and about the same relative humidity. The ripening conditions can be adapted individually to the specific requirements and qualities.

2.11) Before packaging, the product is cooled for 24 to 48 hours to approximately 8° C.

This product is substantially comparable in terms of its taste and scent with a corresponding product made from animal milk. With regard to consistency, it can even be superior to a product made from animal milk as a result of its creaminess. There can be slight differences with regard to taste, but they are not substantially detrimental.

Other cheeses similar to Roquefort, for example, can be manufactured as described in Example 2, whereby the mold fungus cultures necessary for the specific type of cheese are used, and the ripening conditions are adapted accordingly.

For spreadable red cheeses such as Limburger, bacteria cultures of the type *Brevibacterium linens* are added to the culture cocktail (Step 2.8)) as described in the "Wiesby Product Manual" (See Step 1.6a) or a similar source, which is available from the company named in Step 1.6a).

EXAMPLE 3

3.1) To manufacture hard cheese such as Tilsit or Gouda, for example, or a similar product, the primary material is the same soy milk as in Example 1.

3.2) This soy milk is treated as described in Steps 1.1) to 1.4) in Example 1.

3.3) A proportion of about 1 to 4% by weight, preferably about 2.5% by weight, of a known coagulant, preferably Nigari (magnesium chloride) is then added to the soy milk at approximately 85° C. The water that is discharged during coagulation is removed.

3.4) The coagulated soybean protein is then washed once or twice with hot water (approximately 90° C.). Stable protein globules result, which are of major importance for the proper consistency and attractive appearance of the final product.

3.5) The soy protein that results is then transported to a known molding and pressing system appropriate for the specific variety of cheese, and is dehydrated by pressing to a content of approximately 65% by weight water. The residual dehydration is performed in a pressing process by increasing the press pressure from about 0 to approximately 15 kg/cm2 for about one hour. The cheese is then turned once. The pressing process is continued for about 4 hours, during which time the product is turned about once every hour.

3.6) The cheese is then cooled to a temperature of approximately 38° C.

3.7) Using, for example, hollow needles, the cheese is then inoculated as described in Step 2.7), whereby the culture cocktail is manufactured as described in Step 3.8).

As an alternative to Steps 3.5) to 3.7), the soybean protein can also first be cooled to approximately 38° C. (Step 3.6)). Then the culture cocktail is injected (Step 3.7)) and the injected cheese is then pressed and molded, as described in Step 3.5).

3.8) The acidification and fermentation of the cheese is performed using a culture cocktail that is manufactured substantially as described in Steps 2.8a) to 2.8c). The bacterial strain *Brevibacterium linens* can also be added to the culture cocktail.

The quantity of bacteria cultures added can be about 2 to 3.5% by weight. This quantity can depend on, among other possible factors, the desired acidity of the end product, the acidification temperature, and the desired viscosity of the end product. This amount of bacteria culture can be comparable to known processes for the production of cheese, curd or yogurt.

To produce a Gouda or a similar cheese, probionic acid bacteria (bacteria which produce probionic acid) are also added to the cocktail in a dosage as indicated in the "Wiesby Product Manual" (See Step 1.6a)).

3.9) The product is then stored in a sea salt brine at a temperature of approximately 15° C. for approximately 12 hours to equalize the salt content, whereby the pH is set to approximately 5.2 with soy lactic acid.

3.10) The subsequent ripening takes approximately 4 to 6 weeks and is carried out at a temperature of about 14 to 16° C. and a relative humidity of about 90%.

This product is equivalent to a corresponding product made from animal milk, in particular with regard to its taste and appearance. The holes can be somewhat more pronounced than in a corresponding milk based product.

One feature of the invention resides broadly in the method for the manufacture of cheese, quark or yogurt products from soybeans, characterized by the following process steps: (a) Preparation of soy milk from soybeans; (b) Addition of vegetable sugar to the soy milk in a proportion from approximately 1 to 5% by weight; (c) Emulsification of vegetable fats and/or vegetable oils with a total content of approximately 15% by weight into the soy milk; (d) Preparation of a culture cocktail suspension with a pH of between approximately 3.8 and approximately 4.5 by the addition of commercial cheese cultures and animal lactose in a proportion of approximately 10% by weight of the vegetable sugar added in Step (b) to soy milk as described in Step (a); (e) Addition of the culture cocktail to the soy milk as described in Step (c), to acidify the soy milk and to ferment it if necessary, and (f) A final ripening and processing in the manner of the prior art into the desired cheese, quark or yogurt product.

Another feature of the invention resides broadly in the method characterized by the fact that the undesirable scent or flavor components are removed from the soy milk described in Step (a) by vacuum degassing.

Yet another feature of the invention resides broadly in the method characterized by the fact that the soy milk as described in Step (a) is adjusted to a solids content of about 12% by weight.

Still another feature of the invention resides broadly in the method characterized by the fact that the vegetable sugar described in Step (b) is dextrose or glucose.

A further feature of the invention resides broadly in the method characterized by the fact that vegetable fats and vegetable oils with a high content of unsaturated fatty acids are added in a ratio of approximately 1 to 1 by weight.

Another feature of the invention resides broadly in the method in particular for the manufacture of quark or cream cheese products, characterized by the fact that as claimed in Step (e), the soy milk is acidified with the culture cocktail described in Step (d) to a pH of approximately 4.5 and then up to about 30% by weight of water is separated and removed, and then, as claimed in Step (f), approximately 0.5% sea salt and herb and/or fruit preparations are added to enhance the taste.

Yet another feature of the invention resides broadly in the method in particular for the manufacture of soft cheese such as Brie or Camembert, characterized by the fact that following Step (c), the soybean protein from the soy milk is coagulated by the addition of a coagulant, and the water that is discharged is removed.

Still another feature of the invention resides broadly in the method characterized by the fact that the coagulant is magnesium chloride from sea salt, which is added to the soy milk in a proportion of approximately 0.15% by weight at a temperature of the soy milk of approximately 85° C.

A further feature of the invention resides broadly in the method characterized by the fact that the coagulated soybean protein is washed once or twice with water at a temperature of approximately 90° C.

Another feature of the invention resides broadly in the method characterized by the fact that about 1 to 10% by weight of Kombucha-Teepilz culture symbiosis is added to the culture cocktail prepared as described in Step (d).

Yet another feature of the invention resides broadly in the method characterized by the fact that about 1 to 2 doses or units per liter of mold fungus cultures such as *Penicillium candidum* and/or *Penicillium camemberti* and/or *Geotrichum candidum* are also added to the culture cocktail.

Still another feature of the invention resides broadly in the method characterized by the fact that the coagulated soybean protein is dehydrated by pressing in appropriate molds to a moisture content of approximately 70% by weight, and the culture cocktail is injected into the cheese by means of hollow needles, to acidify and ferment the cheese.

A further feature of the invention resides broadly in the method in particular for the manufacture of hard cheese, characterized by the fact that the coagulant is magnesium chloride from sea salt, which is added at a temperature of the soy milk of approximately 85° C. in a proportion of approximately 2.5% by weight.

Another feature of the invention resides broadly in the method characterized by the fact that the coagulated soybean protein is washed once or twice with water at a temperature of approximately 90° C.

Yet another feature of the invention resides broadly in the method characterized by the fact that about 1 to 10% by weight Kombucha-Teepilz culture symbiosis is added to the culture cocktail prepared as claimed in Step (d) in claim 1.

Still another feature of the invention resides broadly in the method characterized by the fact that the bacterial strain Brevibacterium linens is added to the culture cocktail.

A further feature of the invention resides broadly in the method characterized by the fact that probionic acid bacteria are added to the culture cocktail.

Another feature of the invention resides broadly in the method characterized by the fact that the coagulated 304 albumin is dehydrated by pressing in appropriate molds to a moisture content of approximately 65% by weight, and the culture cocktail is injected into the cheese by means of hollow needles, to acidify and ferment the cheese.

Yet another feature of the invention resides broadly in the method characterized by the fact that instead of soy milk, the milk used is derived from the beans of another legumes.

Still another feature of the invention resides broadly in the cheese, quark or yogurt product from soybeans, characterized by the fact that it is manufactured using a method described above.

Examples of apparatus and processes for the processing of soy and or the production of soy milk, components of which may be used with embodiments of the present invention, may be found in the following U.S. Pat. Nos. 5,183,681, issued Feb. 2, 1993 to Okamoto et al.; No. 5,270,450, issued Dec. 14, 1993 to Westfall et al.; No. 4,906,482, issued Mar. 6, 1990 to Zemel et al.; No. 4,971,825, issued Nov. 20, 1990 to Kitazume et al.; No. 4,971,810, issued Nov. 20, 1990 to Hoyda et al.; No. 5,077,062, issued Dec. 31, 1991 to Ernster; and No. 5,137,736, issued Aug. 11, 1992 to Eaton et al.

Examples of methods and apparatus for the manufacture of cheese, curd or yogurt products, components of which may be used in embodiments of the present invention, may be found in the following U.S. Pat. Nos. 5,378,478, issued Jan. 3, 1995 to Miller et al.; No. 5,378,479, issued Jan. 3, 1995 to Trecker et al.; No. 5,384,137, issued Jan. 24, 1995 to Bolioli, et al.; No. 5,385,743, issued Jan. 31, 1995 to van der Schaft; No. 5,395,631, issued Mar. 7, 1995 to Sweeney; No. 5,409,716, issued Apr. 25, 1995 to Trumbetas et al.; No. 5,429,829, issued Jul. 4, 1995 to Ernster; No. 5,445,845, issued Nov. 12, 1995 to Farkye et al.; No. 5,447,731, issued Sep. 5, 1995 to Pederson et al.; No. 5,447,740, issued Sep. 5, 1995 to Brown; No. 5,180,604, issued Jan. 19, 1993 to Crane et al.; No. 5,194,283, issued Mar. 16, 1993 to Dupas et al.; No. 5,209,943, issued May 11, 1993 to Pittelko; No. 5,211,972, issued May 18, 1993 to Kratky et al.; No. 5,211,978, issued May 18, 1993 to Merkenich et al.; No. 5,228,395, issued Jul. 20, 1993 to Eggebrecht; No. 5,234,707, issued Aug. 10, 1993 to Merkenich et al.; No. 5,244,687, issued Sep. 14, 1993 to Rybinski et al.; No. 5,262,183, issued Nov. 16, 1993 to Moran et al.; No. 5,277,926, issued Jan. 11, 1994 to Batz et al.; No. 5,301,605, issued Apr. 12, 1994 to Tomatis; and No. 5,330,780, issued Jul. 19, 1994 to Yee et al.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirely herein.

The corresponding foreign and international patent publication applications, namely, Federal Republic of Germany Patent Application No. 196 20 101.2, filed on May 18, 1996, having inventor Wilhelm Hansen, and DE-OS 196 20 101.2 and DE-PS 196 20 101.2 and International Application No. PCT/DE97/02535, filed on May 17, 1997, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. Method for the manufacture of one of cheese, quark, cottage cheese or curd products comprising predominately vegetable products from soybeans to produce a product having an appearance, consistency, scent and taste not significantly different from a corresponding product made from animal milk, comprising the steps of:
   (a) preparation of soy milk from soybeans;
   (b) addition of vegetable sugar to the soy milk in a proportion from approximately 1 to 5% by weight;
   (c) emulsification of vegetable fats and/or vegetable oils with a total content of approximately 15% by weight into the soy milk;
   (d) preparation of a culture cocktail suspension with a pH of between approximately 3.8 and approximately 4.5 by the addition of commercial cheese cultures and animal lactose, which animal lactose is fermented substantially entirely into lactic acid, in a proportion of approximately 10% by weight of the vegetable sugar added in Step (b) to soy milk as described in Step (a), to stimulate the lactic acid bacteria in the commercial cheese cultures to ferment the vegetable sugars to thus produce lactic acid;
   (e) addition of the culture cocktail to the soy milk as described in Step (c), to acidify the soy milk and to ferment it, and
   (f) a final ripening and processing in the manner of the prior art into the desired cheese, quark, cottage cheese or curd product.

2. Method as claimed in claim 1, comprising the step of removing undesirable scent or flavor components from the soy milk by vacuum degassing.

3. Method as claimed in claim 2, comprising the step of adjusting the soy milk as described in Step (a) to a solids content of 12% by weight.

4. Method as claimed in claim 3, wherein the vegetable sugar described in Step (b) is dextrose or glucose.

5. Method as claimed in claim 4, comprising the step of adding vegetable fats and vegetable oils with a high content of unsaturated fatty acids in a ratio of 1 to 1 by weight.

6. Method as claimed in claim 5, for the manufacture of cheese products, comprising the steps of acidifying the soy milk with the culture cocktail described in Step (d) to a pH of approximately 4.5 and then separating and removing up to 30% by weight of water, and then, as claimed in Step (f), at least one of approximately 0.5% sea salt, herb and fruit preparations are added to enhance the taste.

7. Method as claimed in claim 5, for the manufacture of soft cheese such as Brie or Camembert, comprising the step of coagulating soybean protein from the soy milk by the addition of a coagulant, and the water that is discharged is removed, following Step (c).

8. Method as claimed in claim 7, wherein the coagulant is magnesium chloride from sea salt, which is added to the soy milk in a proportion of approximately 0.15% by weight at a temperature of the soy milk of approximately 85° C.

9. Method as claimed in claim 8, comprising the step of washing the coagulated soybean protein once or twice with water at a temperature of approximately 90° C.

10. Method as claimed in claim 9, comprising the step of adding 1 to 10% by weight of Kombucha-Teepilz culture symbiosis to the culture cocktail prepared as described in Step (d).

11. Method as claimed in claim 10, comprising the step of adding 1 to 2 doses per liter of mold fungus cultures comprising at least one of *Penicillium candidum, Penicillium camemberti* and *Geotrichum candidum* to the culture cocktail.

12. Method as claimed in claim 11, comprising the steps of dehydrating the coagulated soybean protein by pressing in appropriate molds to a moisture content of approximately 70% by weight, and injecting the culture cocktail into the cheese by means of hollow needles, to acidify and ferment the cheese.

13. Method as claimed in claim 5, for the manufacture of hard cheese, wherein the coagulant is magnesium chloride from sea salt, which is added at a temperature of the soy milk of approximately 85° C. in a proportion of approximately 2.5% by weight.

14. Method as claimed in claim 13, comprising the step of washing the coagulated soybean protein once or twice with water at a temperature of approximately 90° C.

15. Method as claimed in claim 14, comprising the step of adding 1 to 10% by weight Kombucha-Teepilz culture symbiosis to the culture cocktail prepared as claimed in Step (d).

16. Method as claimed in claim 15, comprising the steps of adding the bacterial strain *Brevibacterium linens* to the culture cocktail, adding probionic acid bacteria to the culture cocktail, dehydrating the coagulated soybean protein by pressing in appropriate molds to a moisture content of approximately 65% by weight, and injecting the culture cocktail into the cheese by means of hollow needles, to acidify and ferment the cheese.

17. Method for the manufacture of cheese products comprising predominately vegetable products from soybeans to produce a product having an appearance, consistency, scent and taste not significantly different from a corresponding product made from animal milk, comprising the steps of:

(a) preparation of soy milk from soybeans;

(b) addition of vegetable sugar to the soy milk in a proportion from approximately 1 to 5% by weight;

(c) emulsification of vegetable fats and/or vegetable oils with a total content of approximately 15% by weight into the soy milk;

(d) preparation of a culture cocktail suspension with a pH of between approximately 3.8 and approximately 4.5 by the addition of commercial cheese cultures and animal lactose, which animal lactose is in a proportion of approximately 10% by weight of the vegetable sugar added in Step (b) to soy milk as described in Step (a), to stimulate the lactic acid bacteria in the commercial cheese cultures to ferment the vegetable sugars to thus produce lactic acid;

(e) addition of the culture cocktail to the soy milk as described in Step (c), to acidify the soy milk and to ferment it, and to ferment the animal lactose substantially in its entirety into lactic acid; and (f) fermenting said animal lactose with said culture cocktail;

(g) said fermenting of said animal lactose comprising fermenting the animal lactose substantially in its entirety into lactic acid; and (h) a final ripening and processing in the manner of the prior art into the desired cheese product.

18. Method for the manufacture of cheese products comprising predominately vegetable products from soybeans to produce a product having an appearance, consistency, scent and taste not significantly different from a corresponding product made from animal milk, comprising the steps of:

(a) preparation of soy milk from soybeans;

(b) addition of vegetable sugar to the soy milk in a proportion from approximately 1 to 5% by weight;

(c) emulsification of vegetable fats and/or vegetable oils with a total content of approximately 15% by weight into the soy milk;

(d) preparation of a culture cocktail suspension with a pH of between approximately 3.8 and approximately 4.5 by the addition of commercial cheese cultures and animal lactose, the animal lactose being in a proportion of approximately 10% by weight of the vegetable sugar added in Step (b) to soy milk as described in Step (a);

(e) addition of the culture cocktail to the soy milk as described in Step (c), to acidify and ferment the soy milk and to ferment the animal lactose substantially in its entirety into lactic acid; and (f) final ripening and processing in the manner of the prior art into the desired cheese product.

* * * * *